(12) United States Patent
Yang et al.

(10) Patent No.: US 9,789,774 B2
(45) Date of Patent: Oct. 17, 2017

(54) CHARGER FOR VEHICLES (71) Applicant: Hyundai Motor Company, Seoul (KR)

(72) Inventors: Jin Young Yang, Gyeonggi-do (KR);
Dae Woo Lee, Gyeongsangbuk-do (KR); Jong Pil Kim, Gyeonggi-do (KR); Si Hun Yang, Gyeonggi-do (KR); In Yong Yeo, Gyeonggi-do (KR); Byeong Seob Song, Gyeonggi-do (KR); Woo Young Lee, Chungcheongbuk-do (KR)

(73) Assignee: Hyundai Motor Company, Seoul (KR)

( * ) Notice: Subject to any disclaimer, the term of this patent is extended or adjusted under 35 U.S.C. 154(b) by 95 days.

(21) Appl. No.: 14/844,024

(22) Filed: Sep. 3, 2015

(65) Prior Publication Data

US 2016/0288660 A1 Oct. 6, 2016

(30) Foreign Application Priority Data

Apr. 2, 2015 (KR) .................... 10-2015-0046898

(51) Int. Cl.
*H02J 7/00* (2006.01)
*B60L 11/18* (2006.01)

(52) U.S. Cl.
CPC ......... *B60L 11/1809* (2013.01); *H02J 7/0055* (2013.01); *H02J 2007/0059* (2013.01);
(Continued)

(58) Field of Classification Search
CPC .... H02J 2007/0059; H02J 7/0055; H02J 7/34; H02M 3/1582; H02M 3/33507; H02M 3/337; H02M 1/34; H02M 3/33546; H02M 2001/346; Y02B 70/1441; Y02T 90/14; Y02T 10/7241; Y02T 10/7283;
(Continued)

(56) References Cited

U.S. PATENT DOCUMENTS 5,508,903 A * 4/1996 Alexndrov ........ H02M 3/33569
363/16
5,886,884 A 3/1999 Baek et al.
(Continued)

FOREIGN PATENT DOCUMENTS

JP 2003-143867 A 5/2003
JP 2013-116021 A 6/2013
(Continued)

OTHER PUBLICATIONS

Park, Yu-Cheol, et al., "A Study on the Intelligent Charger of Neighborhood Electric Vehicle", English Abstract, pp. 990-991 (Jul. 2010).

*Primary Examiner* — Helen Rossoshek
(74) *Attorney, Agent, or Firm* — Mintz Levin Cohn Ferris Glovsky and Popeo, P.C.; Peter F. Corless (57) ABSTRACT

A device and method are provided for a charger for vehicles. In particular, the charger includes, an AC/DC converter configured to convert a commercial alternating current power source to a direct current power source and a DC/DC converter configured to convert the direct current power source applied from the AC/DC converter to a battery charging power source. The direct current power source is supplied to a battery. The DC/DC converter includes a snubber circuit that reduces the magnitude of a ripple current of the charging power source.

6 Claims, 10 Drawing Sheets (52) U.S. Cl.
CPC .......... *Y02T 10/7005* (2013.01); *Y02T 90/122* (2013.01); *Y02T 90/127* (2013.01); *Y02T 90/14* (2013.01)

(58) Field of Classification Search
CPC .. Y02T 10/62; B60L 2210/10; B60L 11/1809; B60L 2210/14; B60L 2210/30
See application file for complete search history.

(56) References Cited

U.S. PATENT DOCUMENTS

| | | | | |
|---|---|---|---|---|
| 6,016,258 A * | 1/2000 | Jain | ................. | H02M 1/38 363/132 |
| 6,052,294 A * | 4/2000 | Jacobs | ................. | H02M 1/34 363/126 |
| 6,452,815 B1 * | 9/2002 | Zhu | ................. | H02M 1/34 363/17 |
| 8,054,633 B2 * | 11/2011 | Suwa | ................. | B60L 1/003 361/637 |
| 8,184,458 B2 * | 5/2012 | Isurin | ................. | H02M 1/34 363/40 |
| 8,400,800 B2 * | 3/2013 | Alexander | ................. | H02M 3/1582 363/123 |
| 8,787,044 B2 * | 7/2014 | Yang | ................. | H02M 3/33576 363/17 |
| 2002/0097588 A1 * | 7/2002 | Priegnitz | ................. | H02M 1/34 363/21.04 |
| 2008/0170418 A1 * | 7/2008 | Nishiyama | ................. | H02M 3/337 363/17 |
| 2011/0090716 A1 * | 4/2011 | Asuke | ................. | H02M 1/34 363/21.01 |
| 2012/0074949 A1 * | 3/2012 | Kepley | ................. | H02M 3/33584 324/426 |
| 2012/0249059 A1 | 10/2012 | Matsumae et al. | | |
| 2013/0116889 A1 * | 5/2013 | Zhang | ................. | H02J 1/08 701/36 |
| 2013/0121033 A1 * | 5/2013 | Lehn | ................. | H02M 3/335 363/17 |
| 2013/0188397 A1 * | 7/2013 | Wu | ................. | H02M 3/33576 363/17 |
| 2013/0301304 A1 * | 11/2013 | Murakami | ................. | H02M 3/335 363/17 |
| 2014/0126247 A1 * | 5/2014 | Koch | ................. | H02M 3/33507 363/21.14 |
| 2015/0055262 A1 * | 2/2015 | Lin | ................. | H02M 3/335 361/91.5 |
| 2015/0085534 A1 * | 3/2015 | Abramovitz | ................. | H02M 1/34 363/21.01 |
| 2015/0102765 A1 * | 4/2015 | Lee | ................. | H02M 1/34 320/107 |
| 2015/0162840 A1 * | 6/2015 | Frost | ................. | H02M 3/33569 363/17 |
| 2016/0001665 A1 * | 1/2016 | Kim | ................. | B60L 11/1809 320/109 |
| 2016/0204648 A1 * | 7/2016 | Kawamura | ................. | H02J 7/0077 320/107 |
| 2016/0303984 A1 * | 10/2016 | Lee | ................. | B60L 11/1809 |

FOREIGN PATENT DOCUMENTS

| | | | | |
|---|---|---|---|---|
| JP | 2014-103708 A | 6/2014 | | |
| JP | 076972 A2 * | 4/2015 | ............. | H02M 3/28 |
| KR | 10-1998-031946 | 7/1998 | | |
| KR | 10-0199508 B1 | 6/1999 | | |
| KR | 10-2000-0026943 A | 5/2000 | | |
| KR | 10-2006-0037058 A | 5/2006 | | |
| KR | 10-0998064 B1 | 12/2010 | | |
| KR | 10-2015-0004487 A | 1/2015 | | |

* cited by examiner

CHARGER FOR VEHICLES

CROSS-REFERENCE TO RELATED APPLICATION

This application claims the benefit of and priority to Korean Patent Application No. 10-2015-0046898, filed on Apr. 2, 2015 in the Korean Intellectual Property Office, the disclosure of which is incorporated herein in its entirety by reference.

BACKGROUND

Field of the Invention

The present invention relates to a charger for vehicles, and more particularly, to a charger for vehicles capable of improving charging efficiency by reducing ripples of an output current of a direct current/direct current (DC/DC) converter.

Description of the Prior Art

Typically, a Phase Shift Full Bridge (PSEB) converter used in high power applications has a DC/DC converter, and enables zero voltage switching. However, when the PSPF converter is applied to a slow charger for an Electric Vehicle/Plug-in Hybrid Electric Vehicle (EV/PHEV) as shown in FIG. 1, the leakage inductance of the secondary side of a transformer T1 increases due to the step-up/down ratio of the input/output voltage of the PSFB converter being relatively low.

Due to the leakage inductance of the transformer T1 and a resonance phenomenon which occurs in the parasitic capacitance of the secondary side rectifier diode D6-D9, certain components are subjected to a surge voltage. For example, a snubber circuit is commonly used to absorb the energy generated using the resonance phenomenon and suppress a surge voltage applied to a device.

Figure 1:
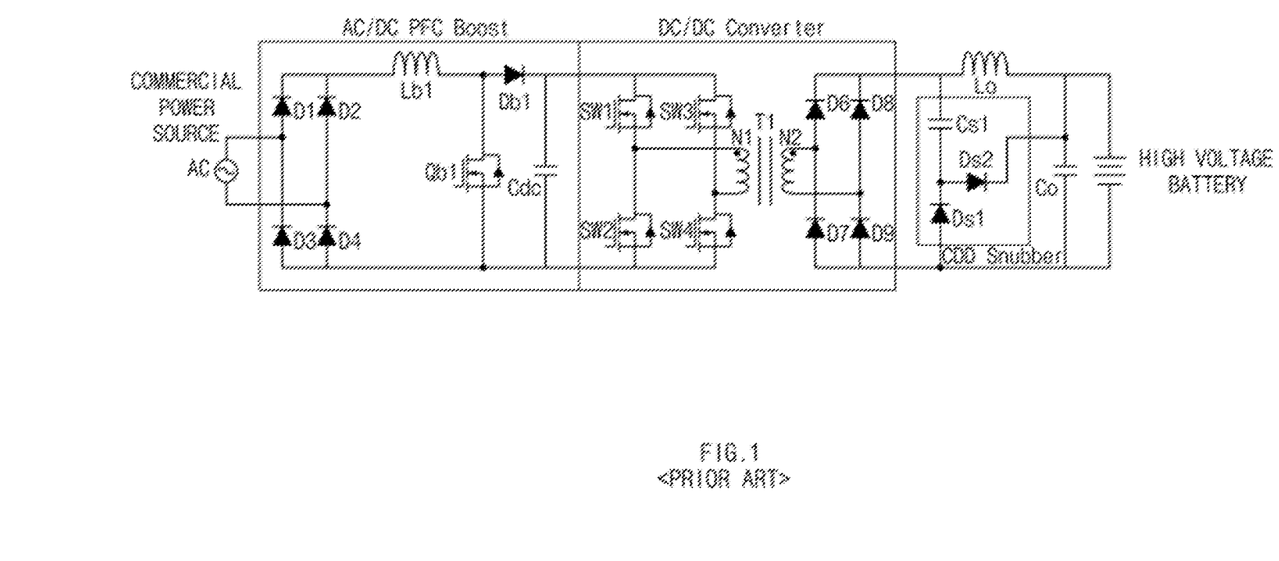
FIG. 1 is an exemplary embodiment of a circuit diagram illustrating a configuration of a charger for vehicles according to the prior art.

Conventionally, the DC/DC converter used in a charger for vehicles has a LC filter to facilitate mitigating the ripple current (e.g. charging energy) of the output capacitor $C_O$ as shown in FIG. 1. However the ripple current magnitude of the output capacitor $C_O$ is increased since the energy absorbed through the capacitor Cs1 of the snubber circuit charges the output capacitor $C_O$ through the diode Ds2. Thus, the prior art has the disadvantage that an increased number of the output capacitors are required to facilitate suppressing the performance degradation and the ripple current. Additionally, a switching loss exists and the efficiency of the charger is reduced due to the freewheeling current of the transformer T1 being reduced in the OFF operation of a Field Effect Transistor switch due to the operating characteristics of a circuit.

The above information disclosed in this section is merely for enhancement of understanding of the background of the invention and therefore it may contain information that does not form the prior art that is already known in this country to a person of ordinary skill in the art.

SUMMARY

The present invention provides a charger for vehicles capable of reducing the magnitude of ripple current charging an output capacitor by adding a filter circuit composed of a capacitor and inductor in a snubber circuit of a DC/DC converter.

In one aspect, the present exemplary embodiment may provide a charger for vehicles capable of minimizing the conducting loss generated when a current is applied to a switch by reducing the capacitance of a snubber circuit to decrease the freewheeling current of a transformer. Additionally, the present exemplary embodiment may provide a charger for vehicles capable of maximizing the output efficiency of a DC/DC converter without additional components by adjusting the magnetizing inductance by the method which utilizes a gap into the core of a transformer to minimize the switching loss when a switch is engaged in the on position.

In another aspect, a charger for vehicles may include an alternating current/direct current (AC/DC) converter configured to convert a commercial alternating current power source to a direct current power source and a DC/DC converter configured to convert the direct current power source applied from the AC/DC converter to a battery charging power source and supply the current to a battery. The DC/DC converter may include a snubber circuit configured to reduce the magnitude of a ripple current of the charging power source. Further, the AC/DC converter may include a first rectifier configured to receive the commercial alternating current power source. The commercial alternating current power source may be rectified and a boost type converter may be connected to an output of the first rectifier and may be configured to suppress a power factor by reducing a reactive power. Additionally, the boost type converter may be implemented by Power Factor Correction (PFC) boost converter.

In some aspects, the DC/DC converter may include a switch that includes a plurality of switching elements, a transformer configured to transform a primary alternating current power source with a predetermined ratio based on a switching operation of the switch and transmit the primary alternating current power source to a secondary alternating current power source and a second rectifier that may rectify the secondary alternating current power source in the transformer to a direct current power source. A snubber circuit may be configured to suppress a surge voltage of the second rectifier and have a first filter that may reduce the ripple current. A second filter may be connected to an output of the snubber circuit and may be configured to maintain a constant voltage applied to the battery.

In some aspects, the first filter may be a CL filter composed of a capacitor and inductor. The switch may be composed of the full bridge type of a plurality of switching elements. A gap may be formed in a core of the transformer to facilitate adjusting a magnetizing inductance. The present exemplary embodiment may be capable of reducing the magnitude of ripple current charging an output capacitor by adding a filter circuit composed of a capacitor and inductor in a snubber circuit of a DC/DC converter to improve the output performance of the DC/DC converter and thereby decrease noise.

Additionally, the present exemplary embodiment may minimize the conducting loss generated when a current is applied to a switch of a DC/DC converter by reducing the capacitance of a snubber circuit to decrease the freewheeling current of a transformer to increase the efficiency of the DC/DC converter. Furthermore, the present exemplary embodiment may maximize the efficiency of a DC/DC converter without additional component parts since a current may be applied to a switch after discharging the voltage accumulated in the parasitic capacitor of the switch. The magnetizing inductance may adjust the discharge voltage by the method which forms a gap into the core of a transformer to minimize the switching loss. Accordingly, the present exemplary embodiment may reduce the cost of charging a high voltage battery of the electric vehicle/plug in hybrid electric vehicle (EV/PHEV).

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as a non-transitory computer readable media on a computer readable medium containing executable program instructions executed by a processor, controller/control unit or the like. Examples of the computer readable mediums include, but are not limited to, ROM, RAM, Compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
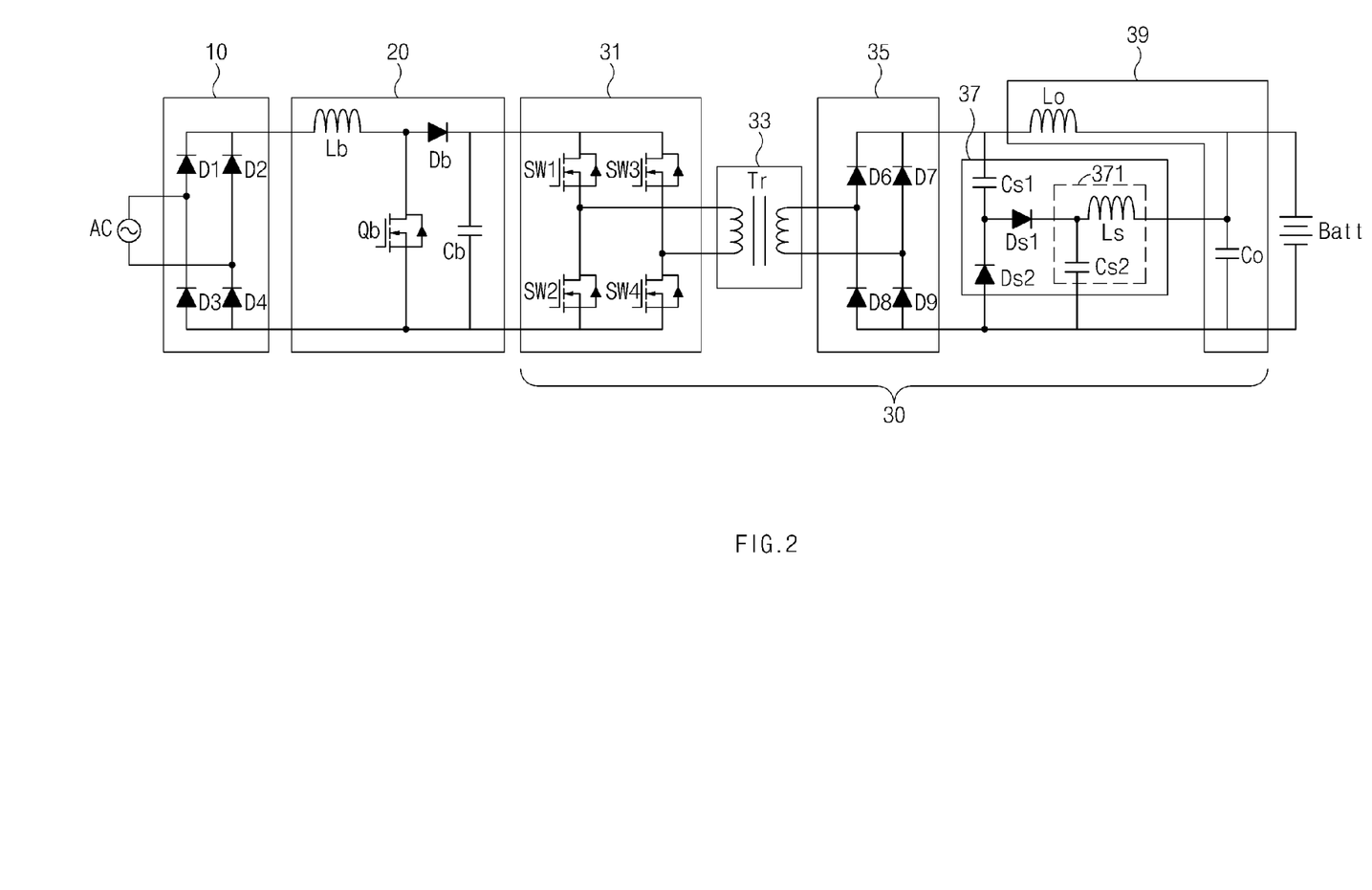
FIG. 2 is an exemplary embodiment a circuit diagram illustrating a configuration of a charger for vehicles according to an exemplary embodiment of the present invention.

FIG. 2 is an exemplary embodiment of a circuit diagram illustrating a configuration of a charger for vehicles. The charger for vehicles may be configured to receive a commercial power source AC as an input and charge the battery mounted within the vehicle. For example, the battery charge may be implemented using a high voltage battery. The charger may include an AC/DC converter that may be configured to convert a commercial AC power source to a DC power source. A DC/DC converter 30 may be configured to convert the DC power source output from the AC/DC converter to the output voltage of the charger based on the voltage variation range of a battery. The AC/DC converter may further include a first rectifier 10 and a boost converter 20.

The first rectifier 10 may be configured convert a commercial AC voltage to a direct voltage, and may include four rectification diodes D1-D4. Diodes D1 and D2 may be connected in series to one end (e.g., a first end) of the commercial power source AC, and diodes D3 and D4 may be connected in series to the other end (e.g., a second end).

In other words, the diodes D1, D2 and the diodes D3, D4 may be connected in parallel with the commercial power source AC.

The boost converter 20 may be connected to the output of the first rectifier 10 and may improve the power factor through reduction of the reactive power. A power factor correction (PFC) boost converter may be used as the boost converter 20. In some exemplary embodiments, the boost converter 20 may be implemented using the PFC boost converter, however, it is not limited to the example and various types of converters may be used. The boost converter 20 may include an inductor Lb, a switching element Qb, a diode Db and a capacitor Cb. One end (e.g., a first end) of the inductor Lb may be connected between diodes D1 and D2, and the other end (e.g., a second end may be connected with the drain terminal of the switching element Qb. The diode Db and the capacitor Cb, may be connected in series to the other end of the inductor Lb, and may be connected in parallel with the switching element Qb.

The source terminal of the switching element Qb may be connected between diodes D3 and D4 of the first rectifier 10. Furthermore, the gate terminal of the switching element Qb may be connected with a control device (e.g., a controller) (not shown). The switching element Qb may perform a turn-on or turn-off operation according to the control signal that may be transmitted from the control device (not shown). The switching element Qb may be composed of a Metal Oxide Semiconductor Field Effect Transistor (MOSFET) or Insulated Gate Bipolar Transistor (IGBT).

The DC/DC converter 30 may be connected to the output end of the boost converter 20 and may be configured to supply the charging power to the battery. The DC/DC converter 30 may include a switch 31, a transformer 33, a second rectifier 35, a snubber circuit 37 and a second filter 39. The switch 31 may include the full bridge type of a plurality of switching elements SW1, SW2, SW3 and SW 4. For example, each element of the switching elements SW1-SW4 may be alternately turned-on or turned-off with a predetermined duty rate. The gate terminal of each of switching elements SW1-SW4 may be connected with the control device and each of switching elements SW1-SW4 may be turned-on or turned-off according to the control signal output from the control device The switching elements SW1-SW4 may apply the power to the primary side of the transformer 33 according to the turn-on or turn-off operation. The switching elements SW1, SW2 and the switching elements SW3, SW4 may be connected to the capacitor Cb of the boost converter 20 in a parallel arrangement. The switching elements SW1-SW4 may be composed of a Metal Oxide Semiconductor Field Effect Transistor (MOSFET) or an Insulated Gate Bipolar Transistor (IGBT).

The Transformer 33 may step-up or step-down (e.g., increase/decrease) the power (e.g. current, voltage), applied to the primary side based on the switching operation of the switching elements SW1-SW4 of the switch 31, according to the setup turns ratio, and transmit the power to the secondary side. One of the primary side terminals of the transformer 33 may be connected to the source terminal of the switching element SW1 and the drain terminal of the switching element SW3, and the other may be connected to the source terminal of the switching element SW2 and the drain terminal of the switching element SW4.

The transformer 33 may insulate the battery Batt and the commercial power source AC. The transformer 33 may be implemented using a gap transformer for improving Zero Voltage Switching (ZVS) effect. The second rectifier 35 may be connected to the secondary side of the transformer 33, and may rectify the AC power source output from the transformer 33 into the DC power source. The second rectifier 35 may be composed of four rectification diodes D6-D9.

The snubber circuit 37 may be connected to the output of the second rectifier 35, and may suppress the surge voltage of the second rectifier 35. The snubber circuit 37 may be composed of one capacitor Cs1 and two diodes Ds1, Ds2. The snubber circuit 37 may include a first filter 371 for improving the output performance of the snubber circuit 37. The first filter 371 may be connected to the cathode of the diode Ds1 and may be a CL filter composed of the capacitor Cs2 and the inductor Ls. The first filter 371 may be configured reduce the magnitude of the ripple current output from the snubber circuit 37. The second filter 39 may be configured to stabilize the power supplied to the high voltage battery Batt, and may be a LC filter composed of the inductor Lo and the capacitor Co. In other words, the second filter 39 may serve to maintain a substantially constant voltage applied to the battery Batt.

Figure 3A:
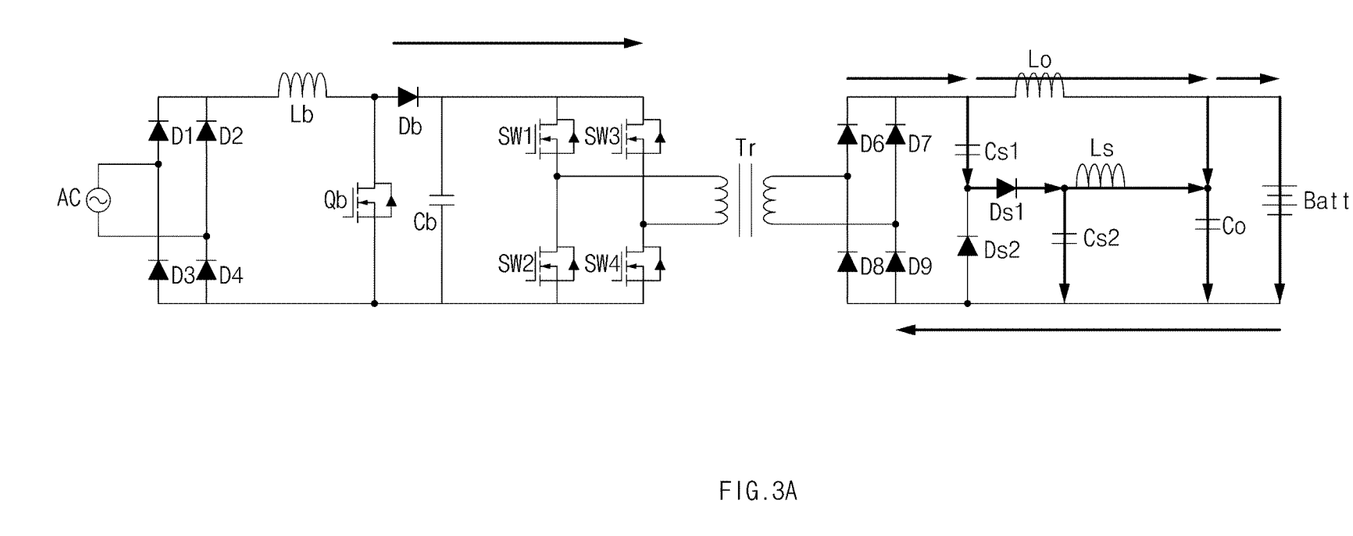
FIG. 3A is an exemplary embodiment of a circuit diagram for illustrating the charging operation of an output capacitor of a DC/DC converter shown in FIG. 2.
Figure 3B:
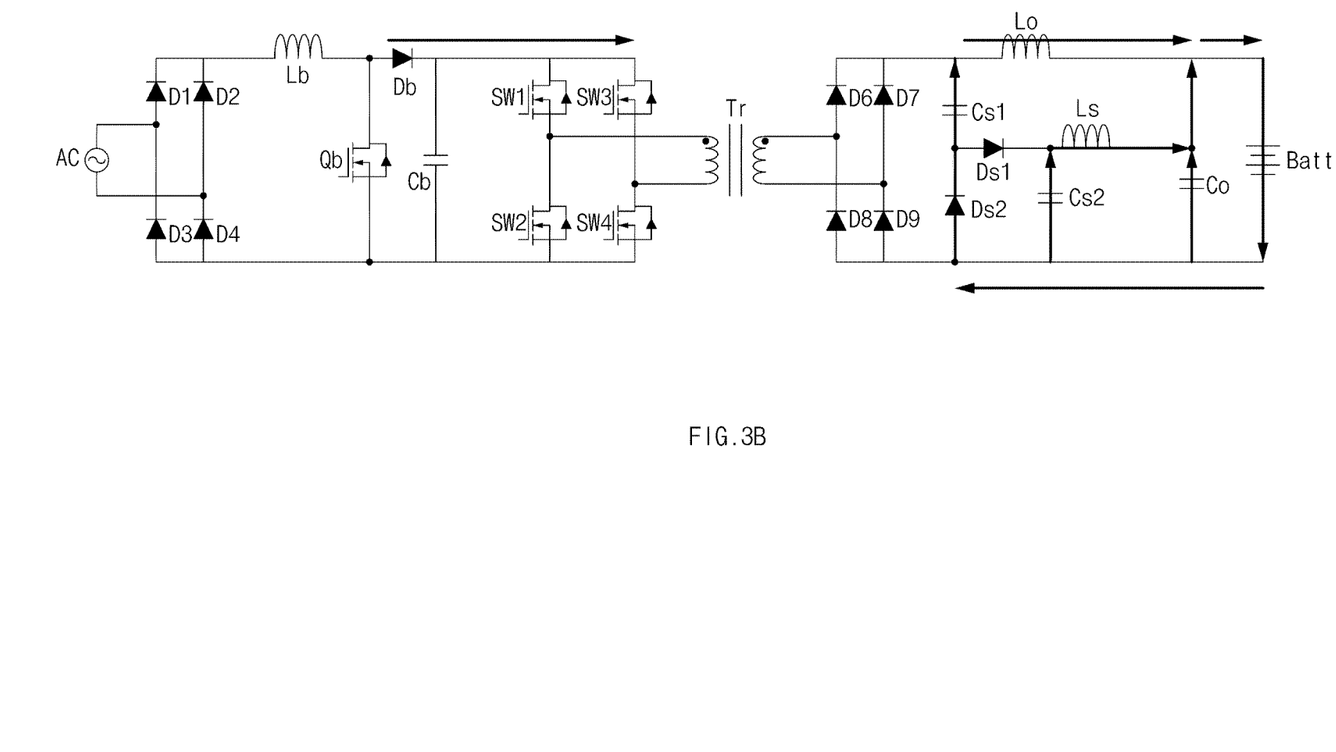
FIG. 3B is an exemplary embodiment of a circuit diagram for illustrating the discharging operation of an output capacitor of a DC/DC converter shown in FIG. 2.
Figure 4:
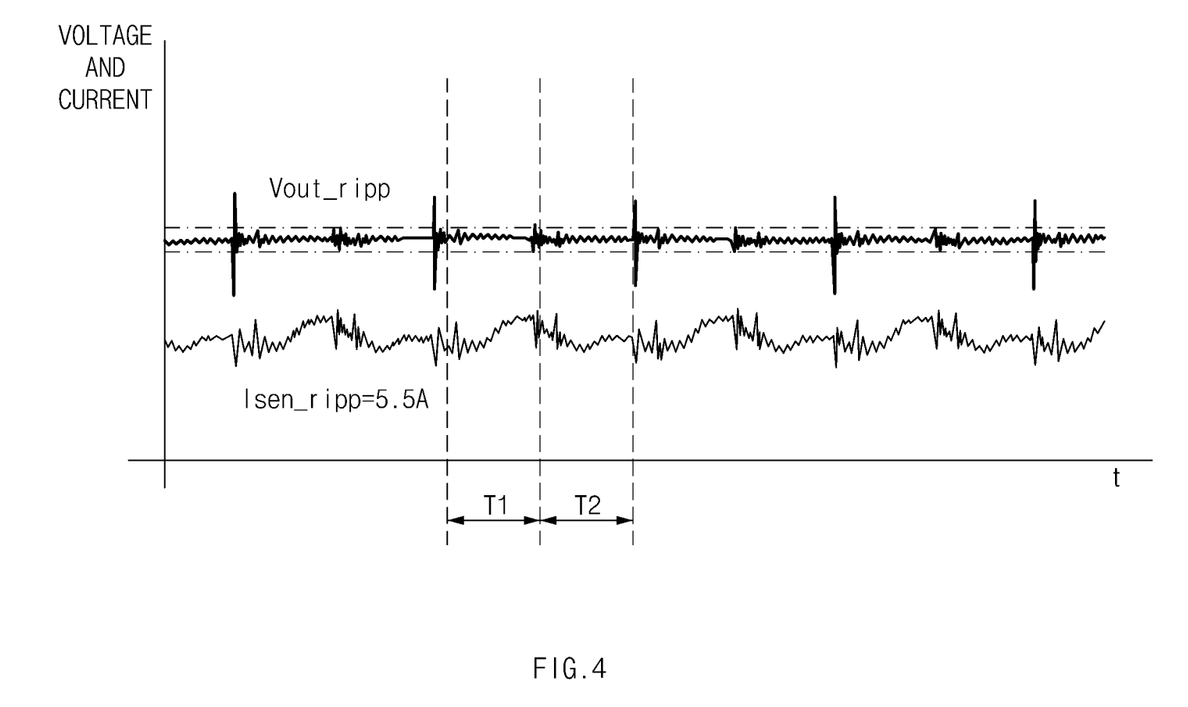
FIG. 4 is an exemplary embodiment of a graph illustrating the output waveform of a snubber circuit according to an exemplary embodiment of the present invention.

As shown in FIG. 3A, an exemplary embodiment of a circuit diagram illustrates the charging operation of an output capacitor of a DC/DC converter shown in FIG. 2. As shown in FIG. 3B, an exemplary embodiment of a circuit diagram illustrates the discharging operation of an output capacitor of a DC/DC converter shown in FIG. 2. Furthermore, FIG. 4 depicts an exemplary embodiment of a graph illustrating the output waveform of a snubber circuit related to an exemplary embodiment of the present invention.

Referring to FIG. 3A, the output capacitor Co of the DC/DC converter 30 is charging, the current charging the capacitor Cs1 of the snubber circuit 37 may be added to the current of the output inductor Lo of the second filter 39 and then may charge the output capacitor Co of the second filter 39. As shown in FIG. 4, the slope of the charging current of the capacitor Cs1 of the snubber circuit 37 may be reduced using the capacitor Cs2 and the inductor Ls connected to the cathode of the diode Ds1. In other words, the magnitude of the ripple current of the snubber circuit 37 may be reduced, thereby minimizing the magnitude of the current applied to the output capacitor Co in comparison with the conventional art. Conversely, referring to FIG. 3B, when the output capacitor Co of the DC/DC converter 30 is discharged (T2), the energy which was charged in the capacitors Cs1 and Cs2 of the snubber circuit 37 may also be discharged.

Figure 5:
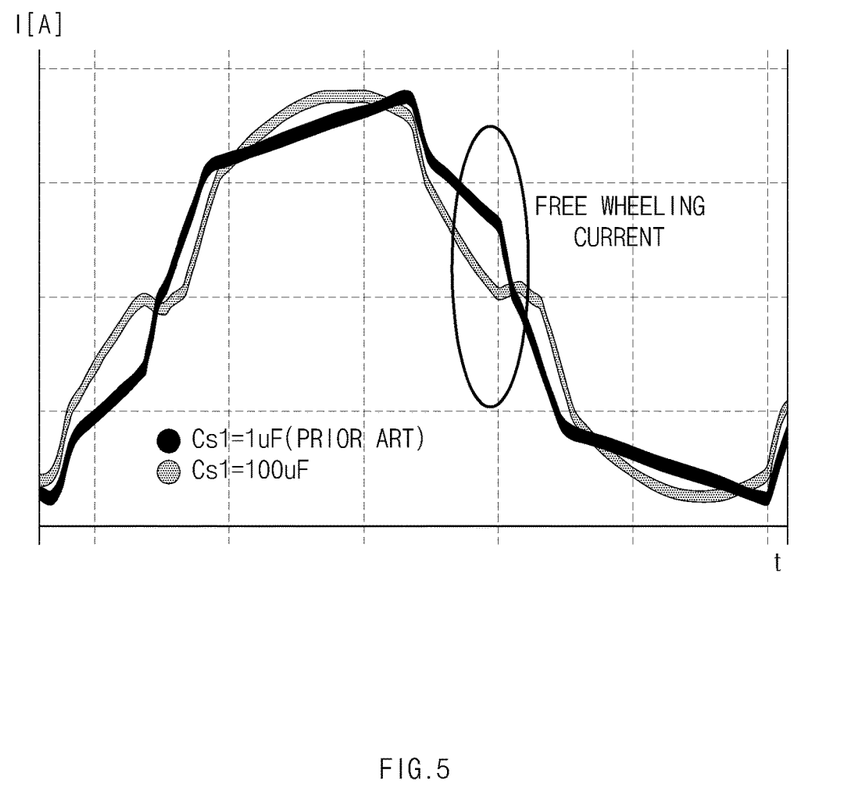
FIG. 5 is an exemplary embodiment of a primary side current waveform graph of a transformer according to the capacitance of a snubber circuit according to an exemplary embodiment of the present invention.
Figure 6:
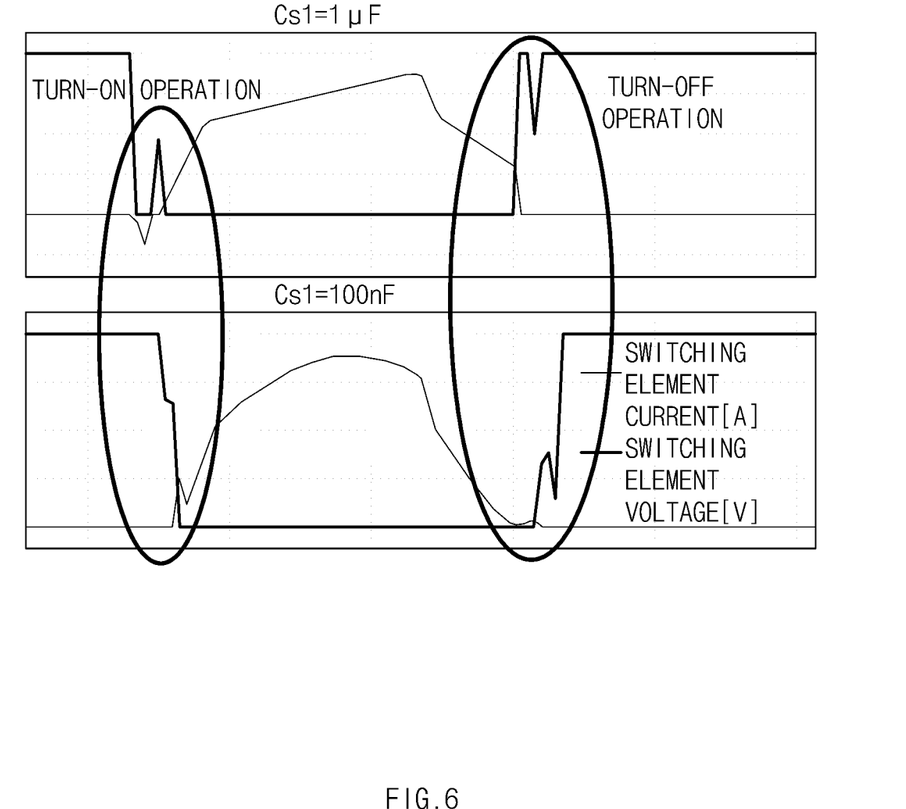
FIG. 6 is an exemplary embodiment of a graph illustrating the switching operation waveform of a switching element according to the capacitance of a snubber circuit; according to an exemplary embodiment of the present invention.

FIG. 5 depicts an exemplary embodiment of a primary side current waveform illustrating a transformer according to the capacitance of a snubber circuit. FIG. 6 is an exemplary embodiment of a graph illustrating the switching operation waveform of a switching element according to the capacitance of a snubber. The charger for vehicles may be configured to decrease the capacitance of the capacitor Cs1 of the snubber circuit 37 and may thereby reduce the freewheeling current of the transformer 33 as shown in FIG. 5. However, as shown in FIG. 6, in some exemplary embodiments, when the capacitance of the capacitor Cs1 of the snubber circuit 37 is increased, the switching loss, the voltage and current of the switching elements SW1-SW4 are overlapped when the switching elements SW1-SW4 are in the off position, still exists. Accordingly, the magnitude of the freewheeling current of the primary side of the transformer 33 may decrease and the off loss of the switching elements SW1-SW4 may be reduced by reducing the capacitance of the capacitor Cs1 of the snubber circuit 37.

Conversely, when the capacitance of the capacitor Cs1 of the snubber circuit 37 is reduced in order to decrease the magnitude of the freewheeling current of the primary side of the transformer, the energy for discharging the parasitic capacitance of the switching elements SW1-SW4 may be insufficient as shown in FIG. 6. The loss may be attributed to the switching elements SW1-SW4 functioning in a turned-on position or a state when the corresponding voltage is applied and overlapped with the current. Accordingly, by applying the method of reducing the magnetizing inductance of the transformer to secure the energy, the zero-voltage/zero-current switching may be enabled and the efficiency of the charger may be increased therefore, a synergistic effect of the vehicle fuel efficiency may occur.

Figure 7A:
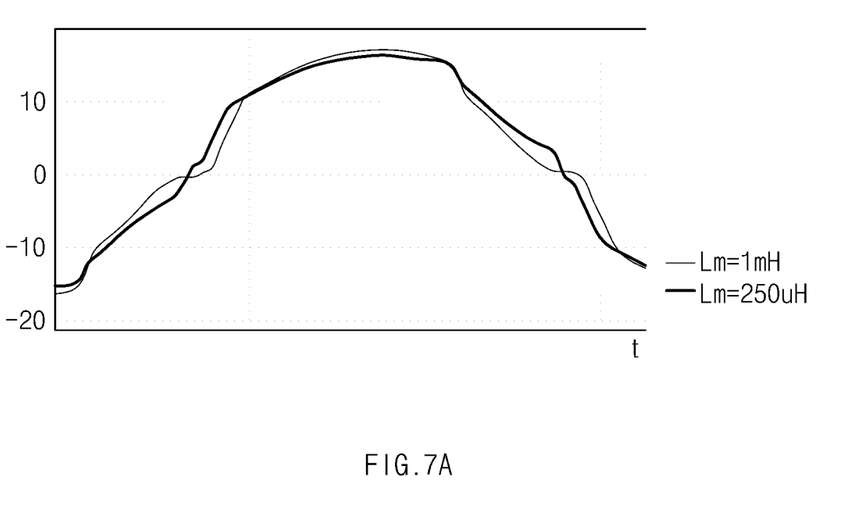
FIG. 7A is an exemplary embodiment of a primary side current waveform graph of a transformer according to the magnetizing inductance; according to an exemplary embodiment of the present invention.

FIG. 7A is an exemplary embodiment of a primary side current waveform graph of a transformer according to the magnetizing inductance related to an exemplary embodiment of the present invention. As further shown in FIGS. 7B and 7C, exemplary embodiments of graphs that illustrate the switching operation waveform of a switching element according to the magnetizing inductance are depicted.

Figure 7B:
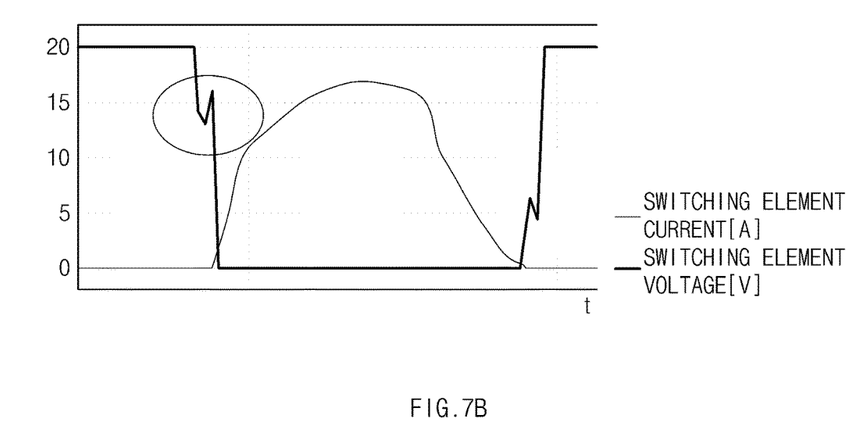
FIG. 7B is an exemplary embodiment of a graph illustrating the switching operation waveform of a switching element according to the magnetizing inductance according to an exemplary embodiment of the present invention.
Figure 7C:
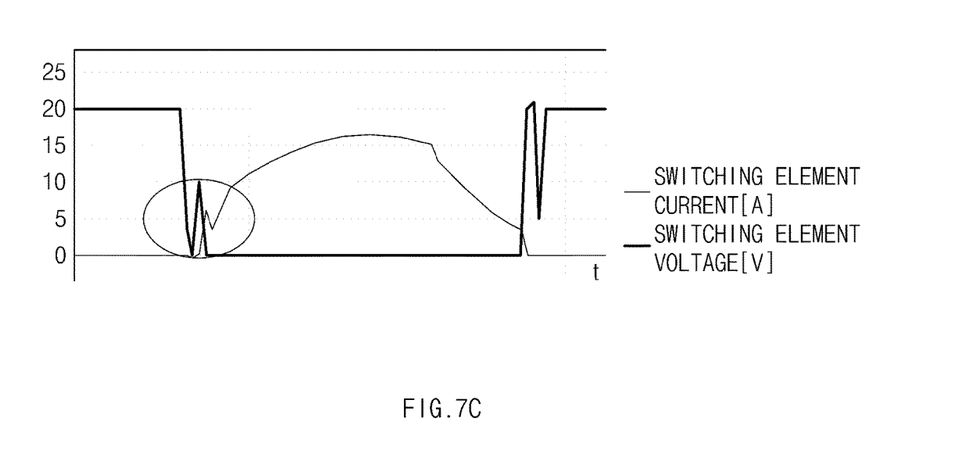
FIG. 7C is an exemplary embodiment of a graph illustrating the switching operation waveform of a switching element according to the magnetizing inductance according to an exemplary embodiment of the present invention.

For example, when the switching elements SW1-SW4 are in an on position, after the voltage accumulated in the parasitic capacitor between the drain and the source of the switching elements SW1-SW4 are discharged. Then, the current may be applied to the switching elements SW1-SW4 to reduce the switching loss of the switching elements SW1-SW4. The magnetizing inductance Lm may be adjusted by inserting a gap within the core of the transformer 33. Accordingly, after the DC/DC converter discharges the voltage that may accumulate in the parasitic capacitor of the switching elements SW1-SW4, the current may be applied to the switching elements SW1-SW4, the output efficiency of the charger may be increased by reducing the switching loss of the switching elements SW1-SW4.

While this disclosure has been described in connection with what is presently considered to be exemplary embodiments and the applications, it is to be understood that the present disclosure is not limited to the disclosed exemplary embodiments and application, but on the contrary, is intended to cover various modifications and equivalent arrangements included within the spirit and scope of the accompanying claims. In addition, it is to be considered that all of these modifications and alternations fall within the scope of the present disclosure.

What is claimed is:

1. A charger for vehicles, comprising:
   an (alternating current/direct current) AC/DC converter configured to convert a commercial alternating current power source to a direct current power source; and
   a DC/DC converter configured to convert the direct current power source applied from the AC/DC converter to a battery charging power source and supply the direct current power source to a battery,
   wherein the DC/DC converter includes;
   a second rectifier configured to rectify a secondary alternating current power source of the transformer to a direct current power source; and
   a snubber circuit which reduces a magnitude of a ripple current of the charging power source,
   wherein the snubber circuit comprises:
   a first filter configured to suppress a surge voltage of the second rectifier and having a first filter reducing the ripple current;
   a first diode configured to be connected to an output of the second rectifier;
   a first capacitor configured to be connected in series to the first diode; and
   a second diode configured to be connected with the first diode in parallel,
   wherein the first filter comprises:
   an inductor configured to be directly connected to a cathode of the second diode; and
   a second capacitor configured to be connected with the inductor in parallel, and
   wherein the slope of the charging current of the first capacitor is reduced by the second capacitor and the inductor during a charging operation.

2. A charger for vehicles according to claim 1, wherein the AC/DC converter comprises:
   a first rectifier configured to receive the commercial alternating current power source and rectify the commercial alternating current power source; and
   a boost type converter configured to be connected to an output of the first rectifier and configured to suppress a power factor by reducing a reactive power.

3. A charger for vehicles according to claim 2, wherein the boost type converter is implemented by Power Factor Correction (PFC) boost converter.

4. A charger for vehicles according to claim 1, wherein the DC/DC converter comprises:
   a switch including of a plurality of switching elements;
   a transformer configured to transform a primary alternating current power source with a predetermined ratio based on a switching operation of the switch and transmit the primary alternating current power source to a secondary alternating current power source; and
   a second filter configured to be connected to an output of the snubber circuit and maintain a constant voltage applied to the battery.

5. A charger for vehicles according to claim 4, wherein the switch includes full bridge type of a plurality of switching elements.

6. A charger for vehicles according to claim 4, wherein a gap is formed in a core of the transformer to facilitate adjusting a magnetizing inductance.

* * * * *